United States Patent [19]

Klemmer

[11] Patent Number: 5,741,340

[45] Date of Patent: Apr. 21, 1998

[54] AIR VENTING UNIT

[76] Inventor: Roland Klemmer, 222 McCraney Street West, Oakville, Ontario L6H 1H7, Canada

[21] Appl. No.: 517,163

[22] Filed: Aug. 18, 1995

[51] Int. Cl.⁶ .................................................. B01D 47/06
[52] U.S. Cl. ............................ 55/240; 55/257.5; 55/260; 261/115
[58] Field of Search ........................ 55/257.1, 257.5, 55/260, 240, 462, 465, 223; 261/126, 115, 118

[56] References Cited

U.S. PATENT DOCUMENTS

| | | | |
|---|---|---|---|
| 1,062,446 | 5/1913 | Ernst | 55/223 |
| 1,604,769 | 10/1926 | Fox | 261/126 |
| 2,387,345 | 10/1945 | Pearl | 261/126 |
| 2,709,580 | 5/1955 | Kameya | 261/126 X |
| 2,736,541 | 2/1956 | Maiman | 261/126 |
| 2,742,708 | 4/1956 | McCormick | 34/76 |
| 2,825,148 | 3/1958 | Olson | 34/75 |
| 3,292,347 | 12/1966 | Hodgkinson | 55/257.4 |
| 3,323,290 | 6/1967 | Stern | 55/223 X |
| 3,702,048 | 11/1972 | Howick | 55/260 X |
| 3,782,080 | 1/1974 | Gallagher | 55/240 X |
| 3,875,678 | 4/1975 | Vits | 34/478 |
| 3,895,926 | 7/1975 | Lerner | 55/260 X |
| 4,969,276 | 11/1990 | Walsh | 34/90 |

FOREIGN PATENT DOCUMENTS 488408  12/1953  Italy ............................ 55/260

*Primary Examiner*—Richard L. Chiesa
*Attorney, Agent, or Firm*—Young & Basile, P.C.

[57] ABSTRACT

A venting apparatus for venting a particulate and/or odorous airstream indoors. The venting apparatus includes an air-water interaction chamber having an air inlet and an air outlet. A spray nozzle is mounted in the interaction chamber for generating within the chamber a water spray substantially spanning the breadth of a major section of the chamber. The spray cleanses the particulate airstream. The interaction chamber is connected to a condensation chamber which discharges the treated air indoors. The condensation chamber has a relatively large cross-sectional area so that vapor present in the fluid is condensed therefrom. The preferred apparatus includes a deflection plate disposed within the interaction chamber for deflecting and dispersing the water spray to substantially span the chamber in a direction generally transverse to the flow of the airstream thereby ensuring that substantially all of the airstream interacts with the water spray.

**19 Cla

AIR VENTING UNIT

BACKGROUND OF THE INVENTION

The present invention relates to venting apparatus, and more particularly, to venting units which filter particles and/or unpleasant fumes and odours from an airstream.

In a typical dwelling, it is often necessary to vent particle-laden, foul or otherwise unpleasant, but non-lethal, gases from the interior of the dwelling to the exterior environment. Examples of such gases generated within the typical dwelling include the lint-laden exhaust gas produced by a laundry dryer, foul odours from a washroom, or fumes end such produced when cooking on a stove and the like. In order to vent such gases outdoors, dwellings are typically constructed with built in fans and venting pipes or outlets at specified locations in the dwelling.

However, it is often desired to construct a washroom or install an appliance which produces such unpleasant gases in an area of the dwelling which does not include a pre-formed or pre-constructed vent. Consequently, it has been usually necessary to expend substantial amounts of time, labour and money to construct new venting in the structure of the dwelling in order to accommodate the new appliance such as a dryer, at that location. These expenditures may be avoided if the unpleasant, but nonlethal, gases can be vented directly into the indoor environment. To do so, however, these gases should be filtered or cleaned to remove undesired particles or odour present therein prior to venting the gases indoors.

The prior art discloses a number of devices which seek to remove undesired particles or odours within a gas. Some of these devices also seek to vent the particle-free or odour-free gases into the indoor environment.

U.S. Pat. No. 2,825,148, issued Mar. 4, 1958 to Olson, discloses a lint trap for a laundry dryer. This device comprises a lint collecting chamber having a water-retaining trough disposed therein. The trough has a plurality of holes formed at the bottom thereof and includes a lower, external, vertical wall depending from the bottom of the trough. Thus, water from within the trough flows along the lower wall thereby forming a film of water adjacent to the surface of the wall. The device preferably includes a nozzle for wetting the inclined surface of a blow-back gate pivotally mounted near the trough, thereby producing a further film of water. Incoming exhaust air from the dryer impinges the wet surfaces whereby the lint suspended in the exhaust air is captured by the films of water. The clean exhaust air is ultimately ducted outdoors with this apparatus.

U.S. Pat. No. 2,742,708, issued Apr. 24, 1956 to McCormick, relates to a laundry dryer and an apparatus within that dryer for discharging the dryer exhaust air indoors. The apparatus comprises a heat exchanger which brings hot, moist, lint-laden, exhaust air from the dryer into heat exchange relationship with a cool airstream drawn in from the ambient. The heat exchanger includes tubular portions, which, as a result of the cooling and condensation of the moist exhaust air flowing therethrough, become coated with a water film that captures or filters lint out of the exhaust air. Thereafter, the cooled and filtered exhaust air is mixed with the cooling air stream and ducted indoors.

U.S. Pat. No. 4,969,276, issued Nov. 13, 1990 to Walsh, discloses a retrofittable air filter/humidifier unit for a clothes dryer wherein lint-laden exhaust air from the dryer is directed through a duct into the unit. In ducting the exhaust air through the unit, the exhaust air encounters an inclined deflector which routes the exhaust air into a water-filled vessel. Lint suspended in the exhaust air is captured by the water bath in the vessel. Afterwards, the cleansed air is selectably vented indoors, outdoors through suitable pre-constructed venting pipes, or a combination of both.

One of the problems encountered in the prior art is the relatively poor efficiency of the venting apparatus in removing lint or other particles from the exhaust air. Routing exhaust air onto or adjacent to a wetted surface does not always remove or capture substantially all of the particles entrained in the exhaust air. The prior art also does not provide for the venting of de-humidified air into the indoor environment by utilizing relatively inexpensive, apparatus. Accordingly, the present invention seeks to address these and other deficiencies of the prior art.

One version of the present invention provides a venting unit which filters particles and/or unpleasant fumes and odours from an exhaust airstream, de-humidifies the air stream, and thereafter vents it indoors. The invention employs a water spray which spans the breadth of an interaction chamber to ensure that substantially all of the exhaust air is brought into contact with the cleansing water. Furthermore, there is disclosed herein preferred means for dispersing the water spray so that it substantially forms a continuous sheet of water as opposed to a perforated spray, thereby ensuring that the particulate laden exhaust air thoroughly interacts with the cleansing water.

In addition, there is disclosed herein an inexpensive means for condensing the moisture out of the vented air stream, which means are predicated, among other things, on the principle of lowering air pressure in order to condense water vapour.

SUMMARY OF THE INVENTION

According to one aspect of the invention, there is provided a venting apparatus for venting a particulate fluid indoors including an air-water interaction chamber having an air inlet and an air outlet in an upper region of the chamber. A sprayer is mounted in the interaction chamber for generating a cleansing water spray substantially spanning the breadth of at least a major section of the chamber, thereby ensuring that substantially all of an airstream flowing from the inlet to the air outlet interacts with the spray. The apparatus includes a condensation chamber having an intake tube, its own outlet, and fixed baffles mounted therein, wherein the intake tube is connected to the interaction chamber outlet. The condensation chamber has a larger cross-sectional area than the intake tube and causes water vapour present in the airstream to condense therefrom.

According to a further aspect of the invention, there is provided an air venting apparatus for removing odours or particles from an airstream comprising an air-water interaction chamber having an air inlet in a sidewall thereof, an air outlet located in an upper region of said chamber, and a drain outlet for removal of water at a bottom of the chamber; a generally horizontally-extending deflector plate mounted in said chamber; a spray nozzle mounted in said chamber below and spaced from said deflector plate, said nozzle being arranged to direct a water spray upwardly towards and at an acute angle to said deflector plate, the water deflected by the deflector plate forming a water screen in said chamber between said air inlet and said air outlet so that most or all of the airstream which enters through said air inlet is required to pass through said water screen before passing into said air outlet; and means for supplying water under pressure to said spray nozzle.

According to another aspect of the invention, there is provided a venting apparatus for use with a clothes dryer including an air-water interaction chamber having an air inlet port connectible to the dryer and an air outlet port arranged in an upper region of the chamber. A nozzle is mounted in the chamber for producing a water spray within the chamber, which spray washes particles out of an airstream flowing from the inlet port to the air outlet. There is a nozzle mounting device within the interaction chamber for supporting the nozzle in such a manner that the water spray forms a water screen in the chamber so that substantially all of the airstream interacts with the water spray before passing through the air outlet. The apparatus includes a condensation device for condensing the vapour out of the airstream. The condensation device has an intake tube and its own outlet. The intake tube is connected to the air outlet of the interaction chamber.

In a preferred embodiment, there is a deflection plate disposed within the interaction chamber for deflecting and dispersing the water spray so that the water screen at least substantially spans the chamber in a direction generally transverse to the direction of flow of the airstream.

The present invention is herein described, by way of non-limiting example only, with reference to the accompanying drawings.

DETAILED DESCRIPTION OF PREFERRED EMBODIMENT

Figure 1:
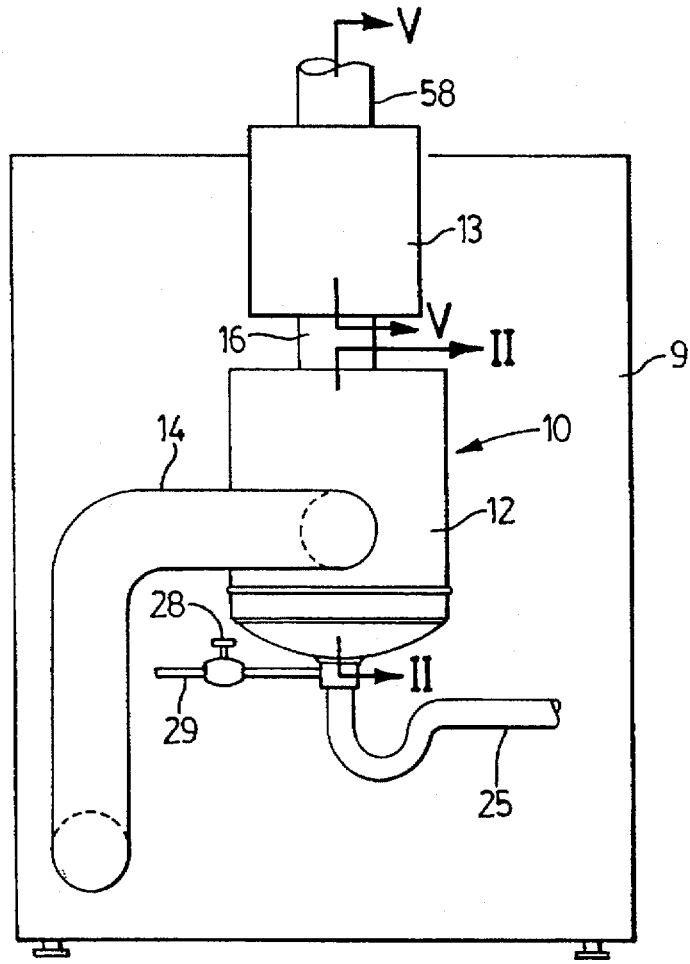
FIG. 1 is a rear elevational view of a clothes dryer equipped with a venting unit constructed in accordance with the invention.
Figure 3:
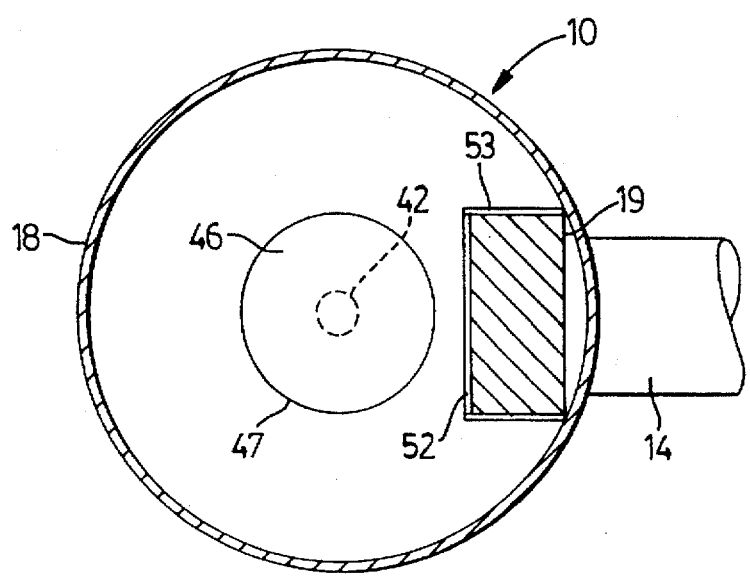
FIG. 3 is a cross-sectional view of the interaction chamber taken along the line III—III of FIG. 2.
Figure 2:
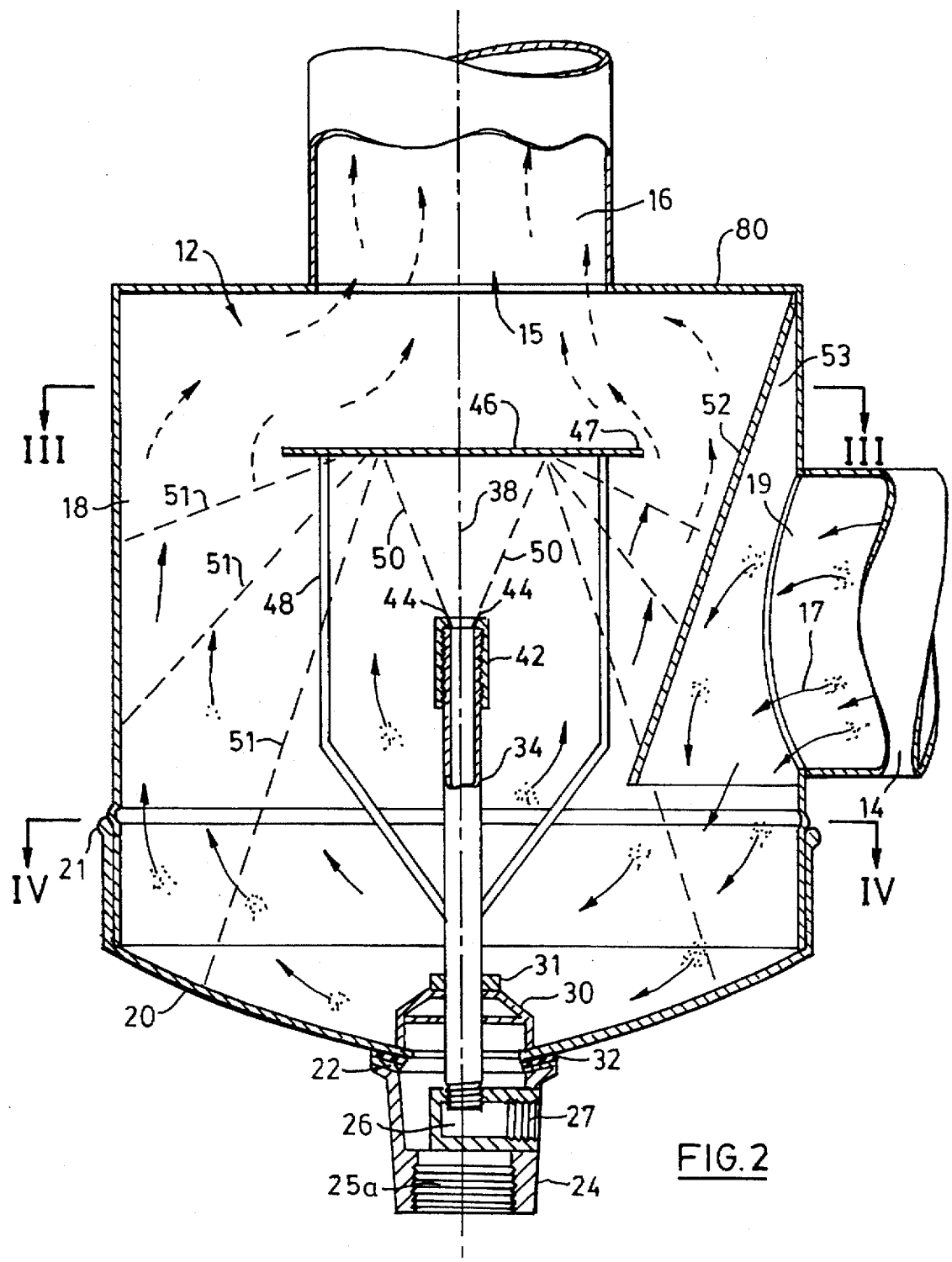
FIG. 2 is a cross-sectional elevation of the interaction chamber of the venting unit, this view being taken along the line II—II of FIG. 1.

Referring to FIGS. 1 and 2 in particular, the air venting unit of the invention is designated generally by reference numeral 10. The venting unit 10 preferably comprises two main chambers, an air-water interaction chamber 12 for the intermingling of an airstream (which may contain particles such as lint) and a cleansing water spray, and a condensation chamber 13 for condensing moisture out of the airstream. For some applications and under some conditions, the chamber 13 may not be required. For example, if the indoor air is normally quite dry, the removal of vapor from the airstream may not be necessary.

The interaction chamber 12 includes an air inlet port 19, which as shown is connected to dryer exhaust pipe 14, and an air outlet port 15 connected to a pipe 16. The particulate airstream, as for example, an exhaust air stream 17 (shown as bold, arrow-headed lines in FIG. 2) from a clothes dryer 9, or the exhaust air from a washroom or kitchen venting fan (not shown), is ducted into the air inlet 19. Air outlet port 15 is connected to the pipe 16 which can be an intake pipe of the condensation chamber 13, which is described in greater detail below. The air inlet 19 is mounted in a sidewall of the chamber while the air outlet 15 is located in an upper region of the chamber.

The interaction chamber 12 is preferably cylindrical in shape and comprised of three separable portions: a cover or hood 18 which forms a top wall 80, a drain bowl/funnel 20, and a tubular drain collar 24. The outlet port 15 is located centrally in the top wall 80. The hood 18 mounts on or in and snugly engages the drain bowl/funnel 20, and the drain bowel/funnel, in turn, has a flange 22 which sits on top of the tubular collar 24. These three components are sealingly connected using known sealing materials or gaskets to prevent any water leakage. Preferably the hood 18 includes latches (not shown) mounted on the bottom portion of the wall for engaging a rim 21 formed on the upper edge of the drain bowl 20, thereby allowing easy separation of the components.

The collar 24 has a water inlet tube 26 formed transversely therein and it features a threaded end 27 for coupling a water hose or water supply line 29 thereto. The water supply line 29 preferably has a valve 28 disposed therein for controlling the flow of water into the chamber 12. Alternatively, the valve may be electrically actuated. In the latter case, the valve 28 can be controlled by a switch, such as a dedicated wall-mounted switch or the switch associated with the electrical circuit for actuating the dryer 9 or other exhaust air source. In this manner, water can be automatically supplied to the venting unit 10 whenever the source of the exhaust air is operative.

The water inlet tube 26 of the collar 24 is connected to a vertical pipe 34 which is coaxial with the tubular collar 24 and extends into the interaction chamber 12. The pipe 34 provides means for supplying water under pressure to a spray nozzle 42. Water collecting in the drain bowl 20, which is dish-shaped, can drain out through the collar 24 which forms a drain outlet. The tubular collar 24 is preferably sized for connection to a standardized drain pipe 25, which can be made of PVC or metal, and includes a threaded end 25a for this purpose. Preferably, there is a strainer or filter 30 disposed at the bottom of the drain bowl 20 and extending over the drain outlet for preventing the tubular collar or the drain from being clogged due to the accumulation of particles, such as lint, therein. Preferably the collar 24 is centrally located in the bottom formed by the bowl 20. The collar/drain can be provided with right or left hand pipe connections.

To provide easy access to the strainer 30 and other components disposed within the chamber 12, the hood 18 can be disengaged from the drain bowl 20 and it, in turn, can be disengaged from the tubular collar 24. In the preferred embodiment, the pipe 34 can be threaded into the transverse water inlet tube 26 thereby connecting the pipe 34 to the collar 24. The pipe 34 preferably features an expansion collar 31 which is soldered or welded thereto. The expansion collar 31, which is preferably made of resilient metal, abuts the drain bowl flange 22 and retains it and the drain bowl 20 in place by the application of pressure thereon. A gasket 32 provides a water-tight seal between the drain bowl 20 and the collar 24.

Figure 10:
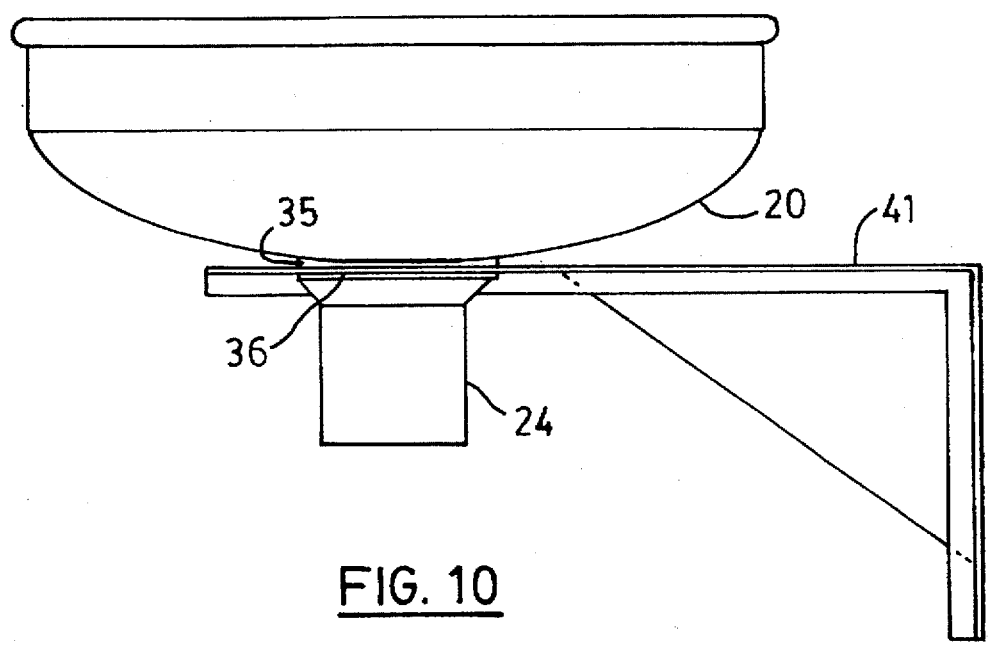
FIG. 10 is a front view of the venting unit mounted onto a mounting bracket.

The drain collar 24 can include a mounting bracket 40, if desired, for mounting the venting unit 10 to a wall or other support structure. FIG. 10 illustrates an alternative embodiment for mounting the venting unit. In this illustration, an L-bracket 41, which has a circular cutout, sits between the drain bowl 20 and tubular collar 24, which is fastened to the drain bowl 20 as described above. The L-bracket 41 thus supports the venting unit. Gaskets 35 and 36 are respectively disposed above and below the L-bracket 41 for providing a sealed contact between the L-bracket and the bowl 20 and collar 24. This L-bracket 41 advantagously allows the venting unit to be turned to make left or right handed water supply connections.

Referring particularly to FIG. 2, the pipe 34 terminates at approximately the centre of the interaction chamber 12. In one preferred embodiment of the invention, the pipe is ¼×6" (i.e. 0.6 cm×15.5 cm) long pipe, although other pipe sizes can readily be used. The spray means or nozzle 42 is mounted on the upper end of the pipe 34 for directing a water spray 50 upwardly and at an acute angle to vertical axis 38. The spray is shown as dashed lines in FIG. 2. The head or face of the nozzle 42 features a plurality of channels or holes 44 formed therein. These holes are preferably arranged in an elliptical or circular array on the upper face of the nozzle and each hole is preferably longitudinally aligned at approximately 5 to 20 degrees with respect to a central axis 38 of the pipe 34 and the chamber in order to generate a substantially conoidal-shaped spray. The nozzle of one preferred embodiment of the invention features fourteen such holes having a diameter of approximately ¹⁄₁₆" or ⁵⁄₃₂ cm and set at an acute angle of approximately 10 degrees to the axis 38. These dimensions and this angle are however not critical to the operation of the invention and can be readily deviated from subject to a guiding principle that the size of nozzle hole should reflect the diameter of the pipe, i.e. increasing proportionally therewith.

In order to ensure that the incoming exhaust air 17 intermingles with the water spray 50, a deflector plate 46 is situated approximately 2.5" or 6 cm away from and above the spray nozzle 42 and is aligned substantially normal to the central axis 38, that is, the plate is substantially horizontal. The illustrated deflector plate 46 is substantially round and is supported in the interaction chamber 12 on wire supports 48 which extend from the pipe 34, although such supports can be mounted elsewhere, such as on the hood 18. The wires 48 can be attached to each end by spot welding. The plate 46 has a circumferential edge 47 spaced from the sidewall of the chamber. The purpose of the deflector plate 46 is to deflect the spray 50 such that it substantially spans the breadth of at least a major section of the interaction chamber 12. The spray 50 preferably strikes the deflector plate at a relatively large acute angle, i.e. on the order of 80 degrees. As the nozzle 42 emits discrete jets or streams of water which collectively comprise the spray 50, the deflector plate 46 assists in dispersing the individual water streams in order for the spray to form a water screen or sheet. This screen is formed in the chamber between the air inlet 19 and the air outlet 15 so that most or all of the airstream which enters the chamber is required to pass through the water screen 51 before passing into the air outlet 15. Preferably the water screen spans the chamber in a direction generally transverse to the direction of flow of the airstream.

Preferably there is also an air deflector or baffle 52 mounted within the interaction chamber 12 to route the incoming exhaust air 17 so that it is forced to travel downwards towards the drain bowl 20 and through the water screen 51. The air deflector 52 thus ensures that the incoming exhaust air 17 does not flow directly over the deflector plate 46 and must interact with the cleansing spray. The deflector 52 also functions as a shield to prevent the backsplash of spray from entering the air inlet port 19. As shown, the preferred deflector 52 has a main section that slopes downwardly from the top corner of the interaction chamber 12 and the deflector's bottom end is spaced a short distance from the air inlet 19. The deflector can have two side walls 53 as well. In this manner, the aerial extent of the water spray 50 can be maximized on that side of the interaction chamber. In one preferred embodiment, the bottom edge of the main sloping section is 2½ inches from the lower portion of the air inlet.

While the invention has been shown with the particular structure of the preferred embodiment described above, the invention also contemplates embodiments which do not employ the deflector plates 46 and/or 52. For instance, an alternative embodiment of the invention (not shown) can employ a nozzle disposed at the top of the interaction chamber, which nozzle provides a downwardly orientated spray or shower for cleansing the exhaust air 17. In such an embodiment, the inlet and outlet ports 19 and 15 are disposed and aligned such that the exhaust air stream cannot bypass the spray or water screen. Preferably, the nozzle of this alternative embodiment should have suitably aligned slots or holes therein such that the spray diverges to substantially span the breadth of the interaction chamber. In addition, such a nozzle may also have a great number of fine holes or slots formed therein for saturating the space within the interaction chamber with the water spray 50. However, a disadvantage in such a finely perforated nozzle is that it generally requires a greater water pressure for adequate water flow therethrough, and such fine perforations tend to become clogged over time due to the precipitation of calcium carbonate and other salts typically present in many residential water sources. In contrast, the nozzle 42 of the preferred embodiment has been found to work well with the typical water pressures found in residences, and the deflector plate 46 has been found to adequately disperse the water spray 50 as described more fully above. Furthermore, the preferred nozzle 42 can be found at many hardware or plumbing supply outlets.

The preferred embodiment has a conoidal-shaped water spray due to the arrangement of the holes on the face of the nozzle. Of course, other arrangements and angles of the holes can be used with the present invention. For instance, the nozzle can be elongate in shape and the slots or holes can be arranged in a linear array so as to yield a planar-shaped spray. The advantage of the preferred conoidal-shaped spray is that the exhaust air flows through or crosses the spray twice, once when flowing from the inlet port 19 to the drain bowl 20 and a second time when flowing from the drain bowl 20 to the outlet port 15.

As mentioned, the water spray 50 cleanses the exhaust airstream 17 from particles, such as lint, entrained therein. In addition, water collects at the bottom of the interaction chamber 12 and this body of water also aids in capturing particles such as lint from the exhaust air. Moreover, the spray 50 provides an environment within the interaction chamber 12 which is effective in reducing or eliminating odours and/or fumes from the exhaust air 17. The spray 50 also effectively cools the exhaust air 17 which is an important consideration when the exhaust air is coming from a clothes dryer and is being released indoors.

Figure 7:
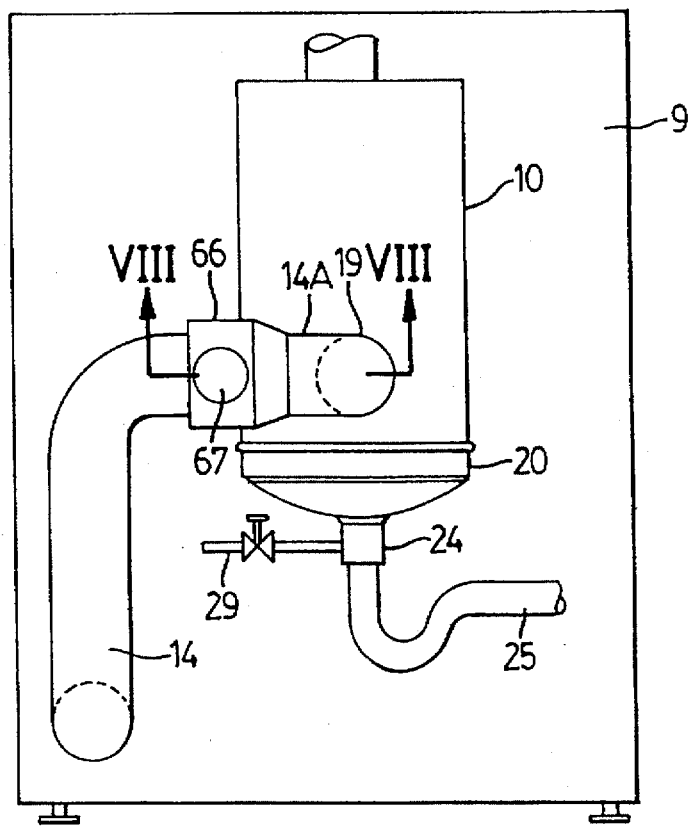
FIG. 7 is a rear elevational view of a clothes dryer equipped with an alternative embodiment of the venting unit, which features a venturi-type inlet.
Figure 8:
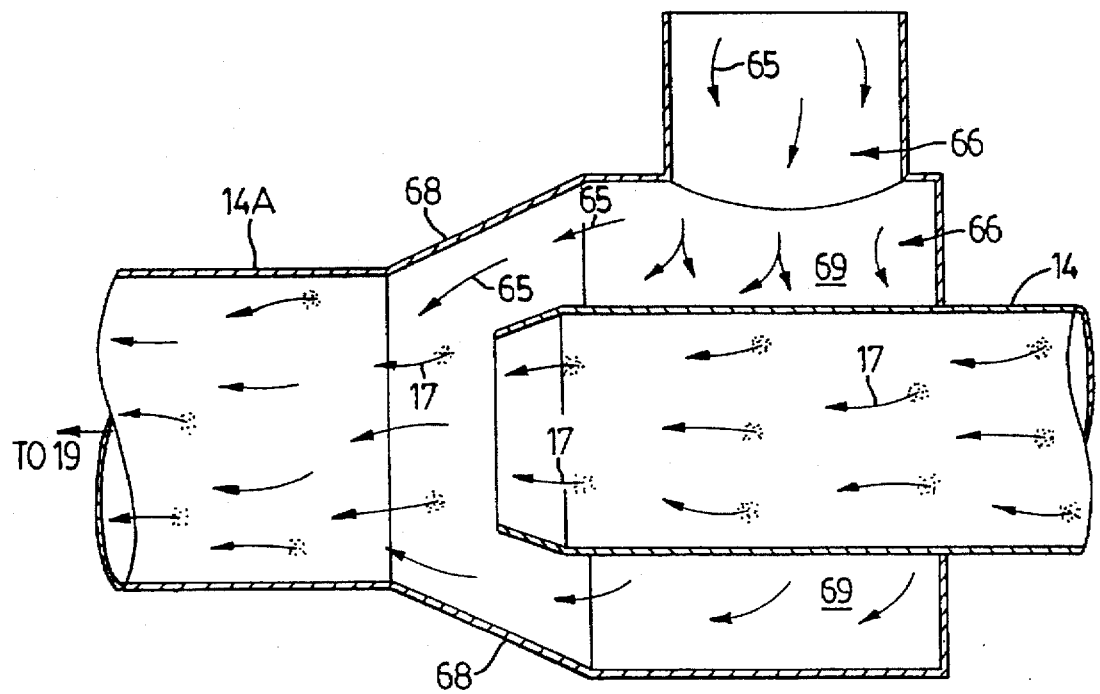
FIG. 8 is a cross-sectional view of the venturi inlet taken along the line VIII—VIII of FIG. 7.

To further reduce the temperature of the exhaust air, which ultimately is ducted indoors, it is possible to precool the exhaust air before it enters the interaction chamber. One method for accomplishing this, as shown in FIGS. 7 and 8, is by incorporating a known venturi-type air inlet 66 in the exhaust pipe 14. The venturi type air inlet is disposed so that its intake end 67 communicates with the indoor environment and its discharge end 68 communicates with an air stream pipe 14A that connects to the air inlet port 19. As shown in FIG. 8, the fast moving exhaust air 17 induces a low presure region 69 in the venturi inlet 66, thereby causing room temperature air (shown as arrows 65) to be drawn into the intake end 67 thereof and flow into the pipe 14A. The room temperature air 65 subsequently mixes with the exhaust airstream 17 and reduces the temperature thereof before it enters the interaction chamber 12.

Figure 5:
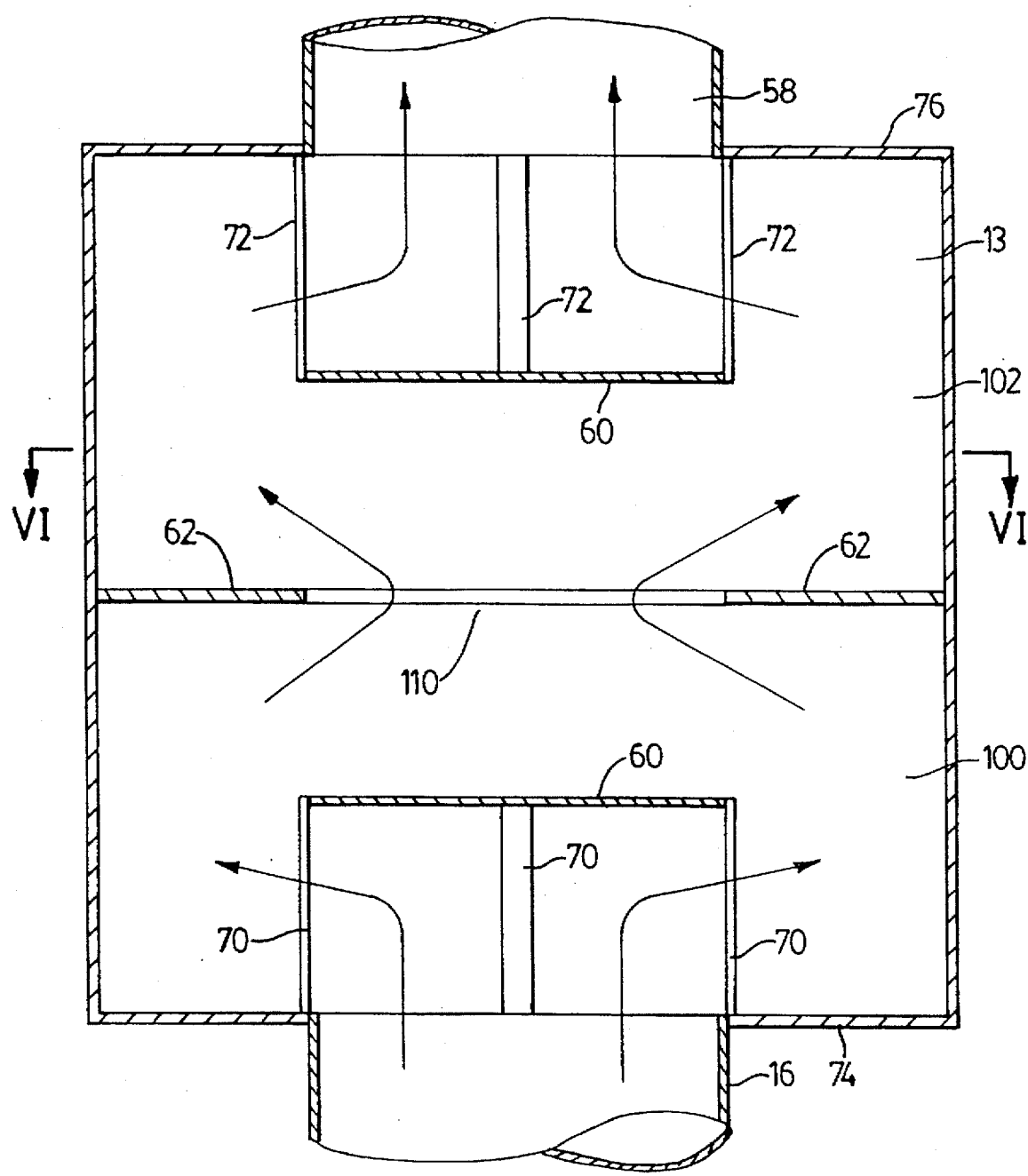
FIG. 5 is a cross-sectional elevation of a condensation chamber for the venting unit, this view being taken along the line V—V of FIG. 1.
Figure 6:
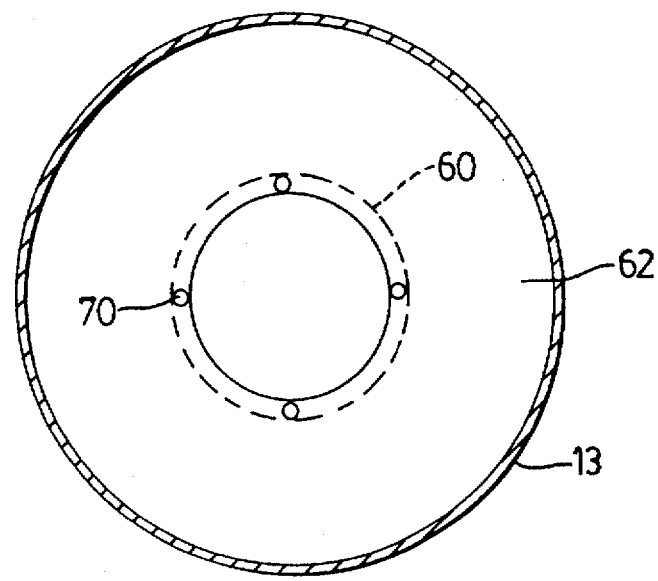
FIG. 6 is a cross-sectional view of the condensation chamber taken along the line VI—VI of FIG. 5.
Figure 4:
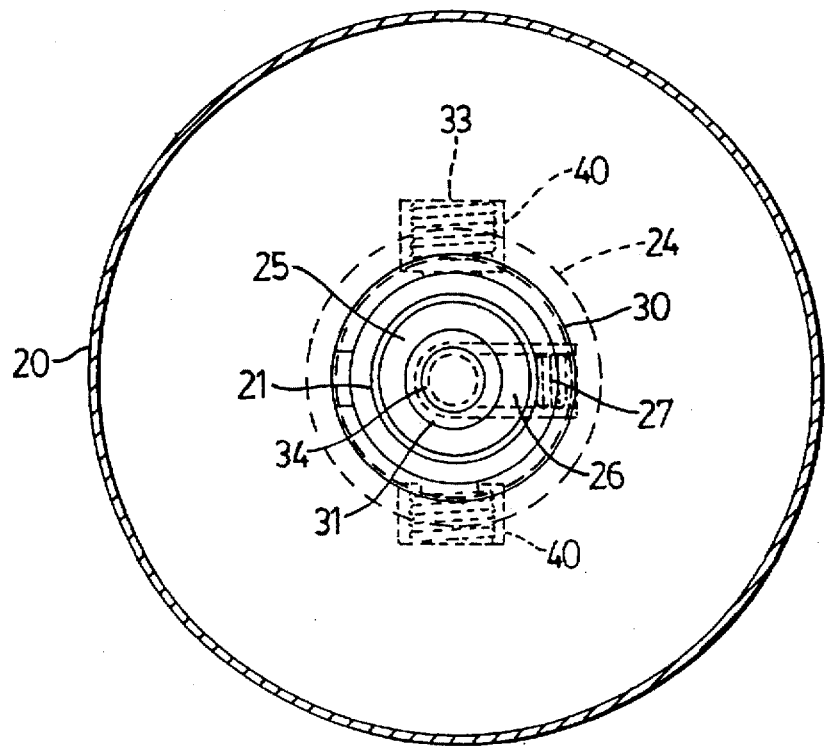
FIG. 4 is a cross-sectional view of the interaction chamber taken along the line IV—IV of FIG. 2.

Referring to FIGS. 1 to 5, after being cleansed in the interaction chamber 12, the exhaust airstream 17 enters preferably the condensation chamber 13 via intake tube or pipe 16. As shown in FIG. 5, the cross-sectional area of the condensation chamber 13 is larger than the cross-sectional area of the intake pipe 16. Thus, exhaust air entering a first stage 100 of the condensation chamber 13 undergoes a drop in air pressure which causes the exhaust airstream to cool, thereby condensing moisture or water out of the exhaust air. In addition, the lower velocity of the exhaust air in the chamber 13 allows water droplets to fall out of the exhaust airstream as it agitated to a lesser degree. As shown in FIG. 1, the chamber 13 is preferably mounted above the interaction chamber 12 in a manner permitting any water present in the condensation chamber to flow into the chamber 12 through the intake tube 16. To assist in this function, the chamber 13 as shown in FIG. 5 includes fixed, horizontal deflection plates 60 and baffle plate(s) 62 for altering the course of the exhaust air therethrough in order to lower the velocity thereof. The two circular plates 60 are supported by vertical wires or straps 70 and 72 which extend up from a bottom plate 74 and down from a top plate 76 respectively. The baffle 62 separates the first stage 100 of the condensation chamber from an upper, second stage 102. The dehumidified or de-moisturized exhaust air 15 may be discharged into an indoor environment via air outlet 90 and a discharge pipe 58.

Preferably the central hole 110 formed by the annular baffle 62 has a diameter about equal to that of the intake tube 16.

Figure 9:
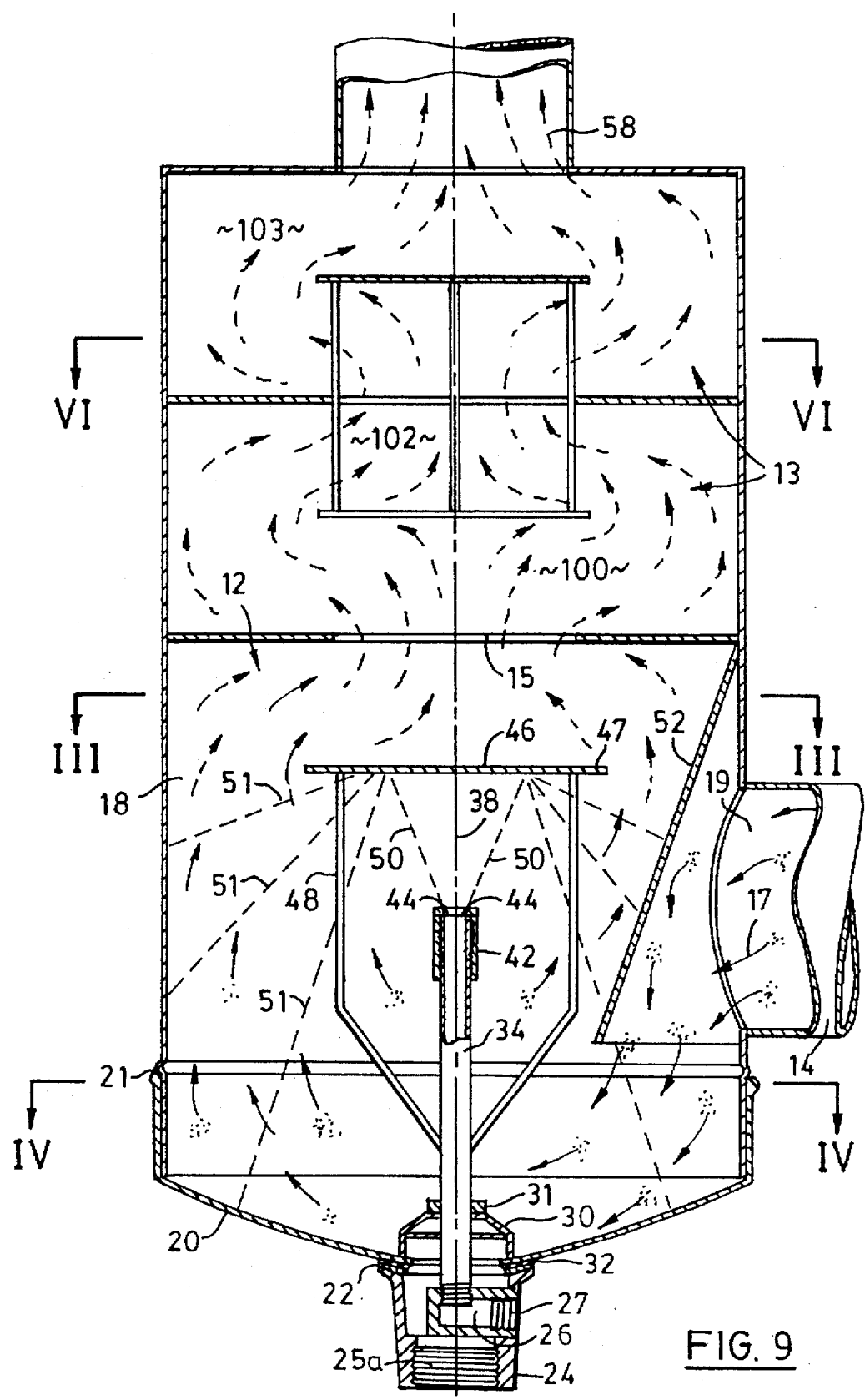
FIG. 9 is a cross-sectional view of an interaction chamber in a further alternative embodiment of the venting unit.

The condensation chamber 13 has been shown in FIGS. 1 to 6 as having first and second stages or sections 100 and 102. Of course, it is possible to construct the condensation chamber 13 with many more such sections thereby increasing the efficiency of the chamber 13. FIG. 9 illustrates such an alternative embodiment having a third stage 103. In this embodiment (as additionally illustrated in FIG. 7) the condensation chamber 13 and interaction chamber 12 are physically housed within one structure for compactness.

Due to the very wet environment within the venting unit, it is preferably constructed of materials that are non-rusting and non-corroding in nature. For example, the water pipes could be made of PVC plastic or brass. Other components such as the drain bowl 20, drain collar 24, deflector plates, etc. could be made of stainless steel, aluminum and various plastics.

The various major components including the hood assembly, air deflector plate, air intake pipe, air outlet pipe and the condenser can be assembled by rivetting and seams are sealed on the inside by a suitable silicone based caulking compound.

In order to conserve water, it is possible to install a pump (not shown) in the venting unit to recirculate water collecting in the interaction chamber from the nozzle. In such an embodiment, a control unit (one readily constructible by persons skilled in the art) can be used for controlling the valve 28 so as to introduce a specified amount of water within the chamber. Furthermore, the tubular collar 24 can be fitted with a diaphragm or valve (not shown) and connected to the control unit in order to control the water drainage rate. Thus, fresh water can be introduced continuously or intermittently into the interaction chamber. Moreover, the pump could also be connected to a reservoir which holds liquid cleansing agents, as are known in the art per se, so that such agents can be injected into the water spray. Such additional mechanisms, of course, increase the cost of the venting unit 10.

Nevertheless, the basic venting apparatus of the invention is relatively inexpensive to manufacture, and is easily retrofitted to an appliance or installed in the structure of a dwelling. The venting apparatus can also be used with a variety of appliances and exhaust fans for rooms within a dwelling, and is not limited to only dryers.

The present invention has been described with a certain degree of particularity, but it should be understood that various alterations and modifications made be without departing from the spirit or scope of the invention as hereinafter claimed.

I therefore claim:

1. An air venting apparatus for removing odours or particles from an airstream comprising:

an air-water interaction chamber having an air inlet in a sidewall thereof, an air outlet located in an upper region of said chamber, a drain outlet operative to continually drain said chamber of water, and a bottom which is dish-shaped with said drain outlet centrally located in said bottom, said bottom sloping radially inwardly and downwardly towards said drain outlet;

a substantially horizontal deflector plate mounted in said chamber, said plate having a circumferential edge spaced from said sidewall of the chamber, an annular gap for passage of said airstream being formed between said circumferential edge and said sidewall;

a spray nozzle mounted in said chamber below and spaced from said deflector plate, said nozzle being arranged to direct a water spray upwardly towards said deflector plate, said nozzle and said plate coacting to cause said spray to deflect from the plate in an outwardly and downwardly directed conical pattern extending from the plate to the sidewall whereby to form a water screen in said chamber between said air inlet and said air outlet so that most or all of the airstream which enters through said air inlet is required to pass upwardly through said water screen, thereafter pass directly through said annular gap, and thereafter pass upwardly into said air outlet; and pipe means for supplying water under pressure to said spray nozzle.

2. An air venting apparatus for removing odours or particles from an airstream comprising:

an air-water interaction chamber having an air inlet in a cylindrical sidewall thereof, an air outlet located in an upper region of said chamber, and a drain outlet at a bottom of the chamber operative to continually drain the chamber of water;

a substantially horizontally extending deflector plate mounted in said chamber, said plate having a circumferential edge spaced from said sidewall of the chamber, an annular gap for passage of said airstream being formed between said circumferential edge and said sidewall;

a spray nozzle mounted in said chamber below and spaced from said deflector plate, said nozzle forming a water spray extending upwardly from said nozzle to said deflector plate, said nozzle and said plate coacting to cause the spray to deflect from the plate in an outwardly and downwardly directed conical pattern extending from the plate to the sidewall whereby to form a water screen in said chamber extending downwardly and outwardly from said deflector plate to said sidewall and between said air inlet and said air outlet so that most or all of the airstream which enters through said air inlet is required to pass upwardly through said water screen, thereafter pass upwardly through said annular gap, and thereafter pass upwardly into said air outlet; and pipe means for supplying water under pressure to said spray nozzle.

3. An air venting apparatus according to claim 2 wherein said interaction chamber is substantially cylindrical in shape with a vertical central axis and a top wall, said air outlet being positioned centrally in said top wall.

4. An air venting apparatus according to claim 2 including a condensation chamber having an intake opening and an outlet, said intake opening being arranged to receive the airstream passing out of said outlet of the interaction chamber, wherein said condensation chamber provides means for permitting water vapor in the airstream exiting the interaction chamber to condense to a liquid state.

5. An air venting apparatus according to claim 4 wherein said condensation chamber includes internal baffle plates for altering the course of an airstream flowing therethrough.

6. An air venting apparatus according to claim 2 including a strainer mounted in the bottom of said chamber and extending over said drain outlet.

7. An air venting apparatus according to claim 2 wherein said air-water interaction chamber has an incoming air baffle mounted therein arranged to route air from said air inlet downwards.

8. An air venting apparatus according to claim 7 wherein said deflector plate is substantially round and said apparatus includes wire supports connected to and supporting said deflector plate.

9. An air venting apparatus according to claim 8 wherein said interaction chamber is substantally cylindrical in shape with a vertical central axis and a top wall, said air outlet being positioned centrally in said top wall.

10. An air venting apparatus according to claim 7 wherein said air baffle extends downwardly at an acute angle to a vertical wall of said interaction chamber.

11. An air venting apparatus for venting an airstream indoors, comprising:

an air-water interaction chamber having an air inlet located in a vertically extending sidewall thereof, an air outlet located in a top wall thereof, and a drain positioned in a bottom of said chamber for draining water out of the chamber;

spray means, mounted in said chamber, for generating within the chamber a cleansing water spray substantially spanning the breadth of at least a major section of the chamber, thereby ensuring that substantially all of an airstream flowing from said inlet to said air outlet interacts with the cleansing spray; and a condensation chamber having an intake opening at one end thereof, its own outlet at an opposite end thereof, and fixed baffles mounted therein, wherein the intake opening is connected to said air outlet of the interaction chamber by means of a pipe having an internal diameter substantially less than the horizontal internal width of said interaction chamber said condensation chamber having a substantially larger transverse cross-sectional area than the intake opening, whereby water vapour present in the airstream is condensed therefrom and wherein said condensation chamber is mounted above said interaction chamber in a manner permitting any water present in the condensation chamber to flow into said interaction chamber through said intake end.

12. A venting apparatus according to claim 11 wherein said fixed baffles are arranged to extend horizontally and to alter the course of the airstream through the condensation chamber, thereby causing vapor present in the fluid to condense therefrom.

13. A venting apparatus according to claim 11 including a venturi inlet operatively connected to the air inlet of said interaction chamber for precooling said airstream prior to entering said interaction chamber.

14. An air venting apparatus for use with a clothes dryer and other sources of exhaust air, comprising:

an air-water interaction chamber having an inlet port located in a cylindrical, vertically extending sidewall thereof and connectible to an exhaust air source, an air outlet arranged in an upper region of said chamber, a bottom, a top wall connected to said sidewall, and a drain located in said bottom for draining water out of said chamber;

a nozzle mounted centrally in the chamber for producing a water spray that extends within the chamber from said nozzle to the cylindrical sidewall and is used to wash particles out of an airstream flowing from said inlet port to said air outlet;

pipe means within the interaction chamber, for supporting the nozzle in such a manner that the water spray forms a water screen in said chamber so that substantially all of the airstream interacts with the water spray before passing through said air outlet; and a condensation chamber having an intake opening at one end thereof, its own outlet at an opposite end thereof, and plurality of internal, fixed baffles mounted therein for altering the course of the airstream through the condensation chamber, wherein the intake opening is connected to said air outlet of the interaction chamber by means of a pipe having an internal diameter substantially less than the horizontal internal width of said interaction chamber, said condensation chamber having a substantially larger transverse cross-sectional area than the intake opening, wherein said condensation chamber and said baffles act to condense vapour out of the airstream and are mounted above said interaction chamber and any water formed in the condensation chamber drains through said intake opening and into said interaction chamber.

15. A venting apparatus according to claim 14 including at least one deflection plate disposed within said chamber for deflecting and dispersing the water spray so that said water screen at least substantially spans the chamber in a direction generally transverse to the direction of flow of said airstream.

16. A venting apparatus according to claim 15 including a baffle plate disposed within the interaction chamber for directing said airstream downwards towards a bottom of said interaction chamber.

17. A venting apparatus according to claim 15 wherein said pipe means is a water supply line to said nozzles, the venting apparatus including a valve for controlling the amount of water supplied to the nozzle.

18. A venting apparatus according to claim 17 wherein said nozzle is mounted in the chamber below and spaced apart from the at least one deflection plate mounted in the chamber, said nozzle being arranged to direct a water spray upwardly towards and at an acute angle to the at least one deflection plate, said nozzle having a plurality of channels therein for dispersing water therefrom and the channels are angled at a small acute angle with respect to a central vertical axis of said supply line, whereby said water spray strikes said at least one deflection plate at a relatively large acute angle.

19. A venting apparatus according to claim 14 including a conduit for connecting said exhaust air source to the inlet port of said interaction chamber, the conduit further including a venturi inlet having an intake end fluidly communicating with an indoor environment and a discharge end in fluid communication with the conduit, the venturi inlet acting to precool hot exhaust air prior to its introduction into said interaction chamber.

* * * * *